United States Patent
Liu et al.

(10) Patent No.: US 7,770,162 B2
(45) Date of Patent: Aug. 3, 2010

(54) STATEMENT SHIFTING TO INCREASE PARALLELISM OF LOOPS

(75) Inventors: Li Liu, Beijing (CN); Zhaohui Du, Shanghia (CN); Bu Qi Cheng, Beijing (CN); Shiwei Liao, San Jose, CA (US); Gansha Wu, Beijing (CN); Tin-fook Ngai, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1252 days.

(21) Appl. No.: 11/321,816

(22) Filed: Dec. 29, 2005

(65) Prior Publication Data

US 2007/0157184 A1 Jul. 5, 2007

(51) Int. Cl.
*G06F 9/45* (2006.01)
(52) U.S. Cl. ...................................... 717/151
(58) Field of Classification Search ................. 717/151
See application file for complete search history.

(56) References Cited

U.S. PATENT DOCUMENTS

| 2005/0198627 A1 | 9/2005 | Du et al. |
| 2007/0079281 A1 | 5/2007 | Liao et al. |
| 2009/0064120 A1* | 3/2009 | Liu et al. .................... 717/160 |

OTHER PUBLICATIONS

Chang et al., "Increasing Parallelism of Loops with the Loop Distribution Technique", Proceedings of National Computer Symposium, 1995, pp. 568-575.*
Ayguade et al., "Partitioning the statement per iteration space using non-singular matrices", International Conference on Supercomputing Proceedings of the 7th international conference on Supercomputing, 1993, pp. 407-415.*
Darte et al., "Loop Shifting for Loop Compaction", International Journal of Parallel Programming, vol. 28, Issue 5, Oct. 2000, pp. 499-534.*
Hall et al., "Maximzing Multiprocessor Performance with the SUIF Compiler", IEEE Computer, Dec. 1996, pp. 84-89.*

* cited by examiner

*Primary Examiner*—Wei Y Zhen
*Assistant Examiner*—Chih-Ching Chow
(74) *Attorney, Agent, or Firm*—Blakely, Sokoloff, Taylor & Zafman LLP

(57) ABSTRACT

A method for statement shifting to increase the parallelism of loops includes constructing a data dependence graph (DDG) to represent dependences between statements in a loop, constructing a basic equations group from the DDG, constructing a dependence equations group derived in part from the basic equations group, and determining a shifting vector for the loop from the dependence equations group, wherein the shifting vector to represent an offset to apply to each statement in the loop for statement shifting. Other embodiments are also disclosed.

17 Claims, 8 Drawing Sheets

```
For J = 2 to 1000
   for K = 5 to 1000
      A[J,K] = A[J,K] + B[J-1,K] + C[J-3,K-1]   <S1>
      B[J,K] = B[J,K] + A[J-1,K-2] + C[J,K-1]   <S2>
      C[J,K] = C[J,K] + A[J-2,K-3] + B[J,K-3]   <S3>
      D[J,K] = D[J,K] + A[J-1,K-4] + C[J,K-3]   <S4>
```

*Fig. 2A* (Original Loop before Statement Shifting)

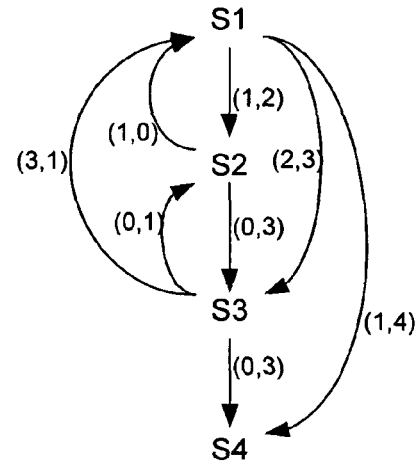

*Fig. 2B* (DDG of Original Loop)

```
distance_a[S1-S2] = offset[S1] - offset[S2] + (1,2)
distance_a[S1-S3] = offset[S1] - offset[S3] + (2,3)
distance_a[S1-S4] = offset[S1] - offset[S4] + (1,4)
distance_a[S2-S1] = offset[S2] - offset[S1] + (1,0)
distance_a[S2-S3] = offset[S2] - offset[S3] + (0,3)
distance_a[S3-S1] = offset[S3] - offset[S1] + (3,1)
distance_a[S3-S2] = offset[S3] - offset[S2] + (0,1)
distance_a[S3-S4] = offset[S3] - offset[S4] + (0,3)
```

*Fig. 2C* (Basic Equations Group)

*Fig. 2D* (Spanning Tree)

```
distance_a[S1-S2] + distance_a[S2-S1] = (2,2)
distance_a[S1-S2] + distance_a[S2-S3] - distance_a[S1-S3] = (0,2)
distance_a[S1-S2] + distance_a[S2-S3] + distance_a[S3-S1] = (4,6)
distance_a[S1-S2] + distance_a[S2-S3] + distance_a[S3-S4] - distance_a[S1-S4] = (0,4)
distance_a[S2-S3] + distance_a[S3-S2] = (0,4)
```

*Fig. 2E* (Dependence Equations Group)

Calculate Shifting offset of each statement in DDG:

1      Initialize a work stack S to be empty stack
2      For every MUCS in DDG
3          Select a statement $v0$ from MUCS, set $offset(v0)=0$, push $v0$ into stack S
4          While S is not empty, pop statement $x$ from stack S
5              For each successor $y$ of $x$
6                  If $offset(y)$ has not been set
7                      Set $offset(y)=offset(x)+distance\_a(x\text{->}y)-distance\_b(x\text{->}y)$
8                      Push $y$ into stack S
9                  End If
10            End For
11            For each predecessor $y$ of $x$
12                If $offset(y)$ has not been set
13                    Set $offset(y) = offset(x) + distance\_a(y\text{->}x) - distance\_a(y\text{->}x)$
14                    Push $y$ into stack S
15                End if
16            End For
17        End While
18        Set $m$ is the minimum $offset$ of all statement in MUCS
19        If $m \neq 0$
20            For every statement $v0$ in MUCS
21                $offset(v0)=offset(v0)-m$
22            End For
23        End If
24    End For

*Fig. 3*

```
For J = 1 to 10000
    for K = 2 to 10000
        A[J,K] = A[J,K] + B[J-1,K-2]      <S1>
        B[J,K] = B[J,K] + A[J-1,K-1]      <S2>
```
Fig. 4A (Original Loop before Statement Shifting)
Fig. 4B (DDG of Original Loop before Shifting)
Fig. 4C (DDG after Shifting)
```
For J = 0 to 10000
    for K = 1 to 10000
        if (1 <= J <= 10000 and 2 <= K <= 10000) then
            A[J,K] = A[J,K] + B[J-1,K-2]           <S1>
        if (0 <= J <= 9999 and 1 <= K <= 9999) then
            B[J+1,K+1] = B[J+1,K+1] + A[J,K]       <S2>
```
Fig. 4D (Loop after Shifting)

```
For P = -20000 to 29998
    for J = max(0, (2+P)/3) to min(10000, (20000+P)/3)
        if ((3J-P) % 2 = 0) then
            if (1 <= J <= 10000 and 2 <= 3J-P <= 20000) then
                A[J,(3J-P)/2] = A[J,(3J-P)/2] + B[J-1,((3J-P)/2)-2)]        <S1>
            if (0 <= J <= 9999 and 0 <= 3J-P <= 19998) then
                B[J+1,((3J-P)/2)+1] = B[J+1,((3J-P)/2)+1] + A[J,(3J-P)/2)]  <S2>
```

*Fig. 5* (Loop after Unimodular Transformation)

Step 1: Calculate *Altitude* of each statement in graph DDG.
i) Initialize a work stack S to empty stack
ii) Pick any statement v0 from DDG, set *Alt(v0)*=0, push v0 into S
iii) While S is not empty, pop statement x from stack S
iv)     For each successor y of x,
v)         If *Alt(y)* has not been set
vi)             Set *Alt(y)* = (*Alt(x)*+*W*(x->y)) (mod *m*);
vii)             Push y into stack S
viii)         End if
ix)     End For
x)     For each predecessor y of x
xi)         If *Alt(y)* has not been set
xii)             Set *Alt(y)*=(*Alt(x)*+*m*-*W*(y->x)) (mod *m*);
xiii)             Push y into stack S
xiv)         End if
xv)     End for
xvi) End While Step 2: Calculate new weight function *W'* of each edge in graph G.
i) For each edge u->v in graph G
ii)     *W'*(u->v)=*floor*((*Alt(u)* + *W*(u->v))/m)*m
iii) End For

*Fig. 6*

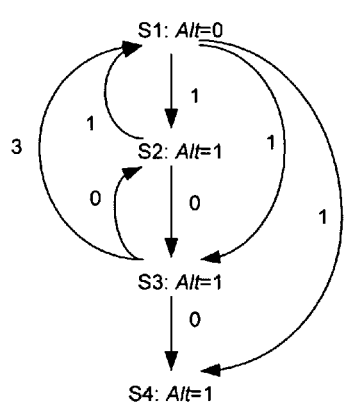
*Fig. 7A* (After Altitude 1st column)
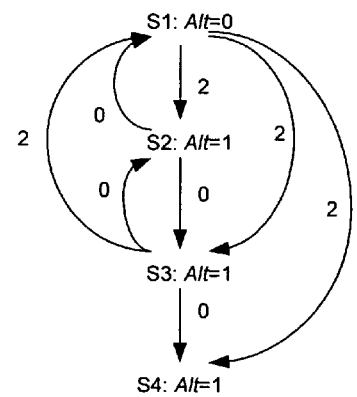
*Fig. 7B* (After Solve *distance_a* 1st Column)
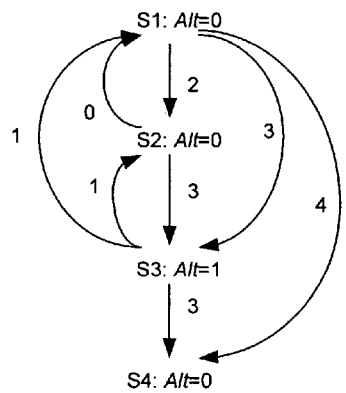
*Fig. 7C* (After Altitude 2nd column)
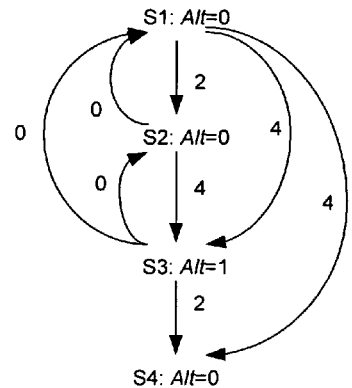
*Fig. 7D* (After Solve *distance_a* 2nd Column)

STATEMENT SHIFTING TO INCREASE PARALLELISM OF LOOPS

FIELD OF THE INVENTION

The embodiments of the invention relate generally to loop transformations and, more specifically, relate to statement shifting to increase parallelism of loops.

BACKGROUND

Multiprocessors, which herein include multi-core processors, are becoming more widespread in the computer industry. As such, parallel execution of code in the multiprocessors is an important technique to take advantage of for performance gains. To optimize performance on multiprocessors, software programs need to be parallelized to take full advantage of parallel execution.

Generally, loops in a software program take additional time in the execution of a program. A technique to reduce this time is loop transformation. Loop transformations are used to increase the parallelism of the software program in modern compilers. Currently, there are many kinds of loop transformations, such as fusion, fission, blocking, shifting, GCD (greatest common divisor) transformation, unimodular transformation, and affine partitioning.

Loop shifting, in particular, involves moving operations from one iteration of the loop body to a different iteration of the loop body. It does this by shifting a set of operations from the beginning of the loop body to the end of the loop body. A copy of these operations is also placed in the loop head or prologue. Loop shifting shifts a set of operations one at a time, thereby exposing just as much parallelism as can be exploited by the available resources. Parallelizing transformations can then operate on the shifted operations to further compact the loop body. Loop shifting can be a beneficial technique to expose parallelism in order to increase the performance, area, and resource utilization of a multiprocessor.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIGS. 2A through 2E illustrate one embodiment of statement shifting by basic equations groups and dependence equations groups;

FIG. 3 depicts a pseudo-code listing of one embodiment of determining an offset for statement shifting;

FIGS. 4A through 4D depict one embodiment of statement shifting;

FIG. 5 illustrates one embodiment of a loop after statement shifting combined with unimodular transformation;

FIG. 6 depicts a pseudo-code listing of one embodiment of an algorithm to increase the parallel chances for greatest common divisor (GCD) transformation;

FIGS. 7A through 7D illustrate one embodiment of an implementation of the algorithm of FIG. 6.

DETAILED DESCRIPTION

A method and apparatus for statement shifting to increase the parallelism of loops are described. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the embodiments of the invention may be practiced without these specific details. In other instances, well-known structures and devices are shown in block diagram form, rather than in detail, in order to avoid obscuring the invention.

Embodiments of the invention present a novel type of loop shifting to be known as statement shifting. Statement shifting is implemented by solving basic and dependence equations groups that are built according to a data dependence graph (DDG) of a loop. In statement shifting, every statement in the loop has its own transformation mapping. The equations groups provide accurate loop transformation constraints for each statement in the loop. By way of the equations groups, statement shifting explores parallel chances for other loop transformation techniques.

Figure 1:
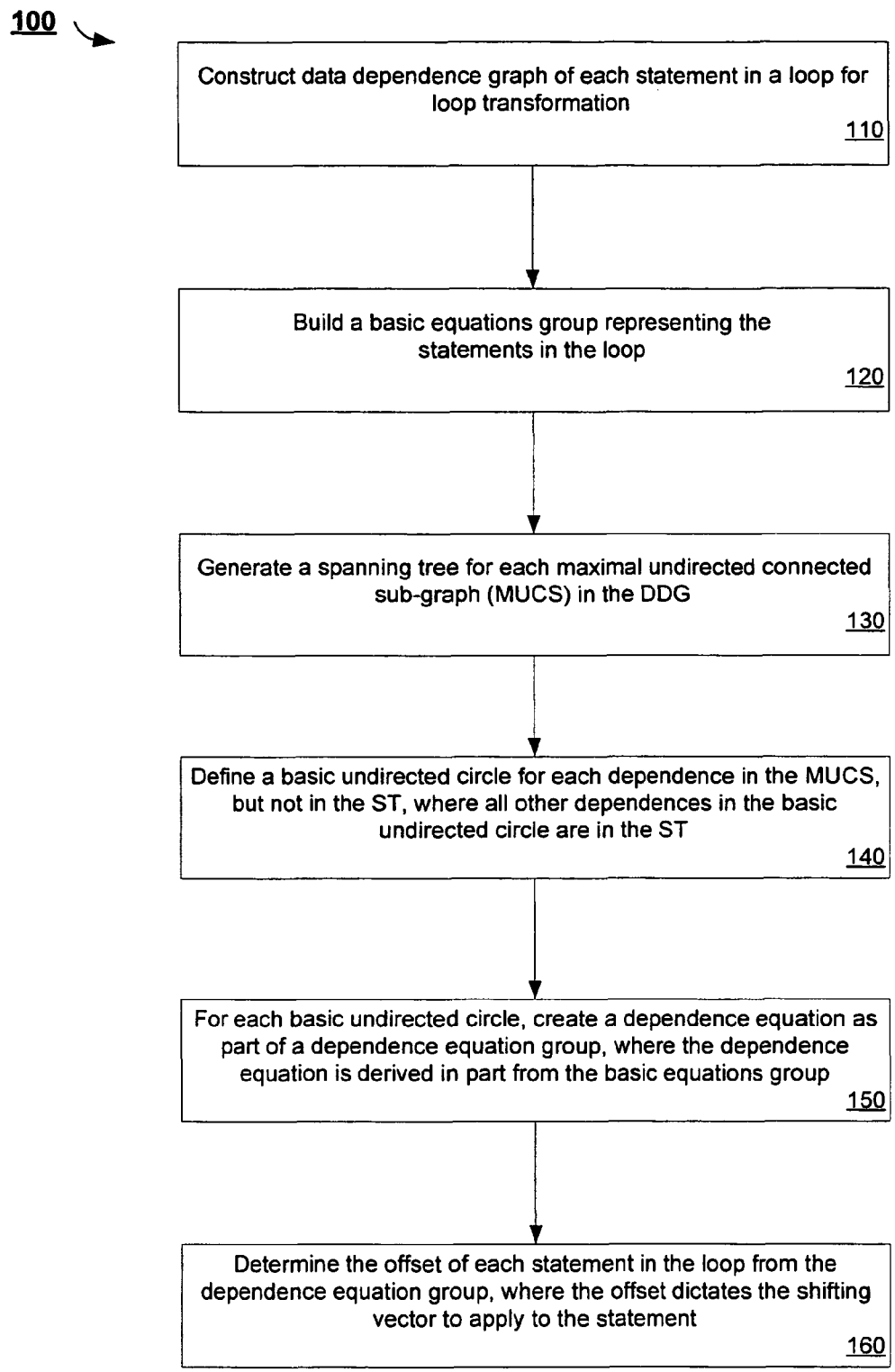
FIG. 1 is a flow diagram of a method of one embodiment of the invention.

FIG. 1 is a flow diagram depicting a method according to embodiments of the invention. The method of FIG. 1 depicts a process 100 to perform statement shifting on a loop in program code. The statement shifting of process 100 operates to change the weight of an edge in a data dependence group (DDG) of the loop. In one embodiment, the logic and operations of process 100 may be part of a parallelizing compiler. In another embodiment, process 100 may be implemented as computer-accessible instructions executable by a computer system.

The process 100 for statement shifting begins at processing block 110, where a DDG is constructed for the loop that is to undergo loop transformation. The DDG is constructed by representing each statement in the loop as a node, and the dependencies between each statement are represented as edges with corresponding weights. Then, at processing block 120, a basic equations group is built representing the statements in the target loop. Further explanation of basic equations groups is provided in a subsequent portion of this description. At processing block 130, a spanning tree (ST) is generated for each maximal undirected connected sub-graph (MUCS) in the DDG. The ST is a graph including every vertex of the target graph. A MUCS is a subgraph that satisfies some specified property (such as being undirected and connected in this case) and to which no node in the parent graph can be added without violating the property.

At processing block 140, a basic undirected circle is defined for each dependence in the MUCS, but not in the ST, where all other dependences in the basic undirected circle are in the ST. At processing block 150, for each basic undirected circle defined at processing block 140, a dependence equation is created that is part of a dependence equations group. Further explanation of dependence equations groups is provided in a subsequent portion of this description. The dependence equations in the dependence equations group are derived, in part, from the basic equations group. Finally, at processing block 160, the offset of each statement in the target loop is determined from the dependence equations group. This offset dictates a shifting vector that is applied to each statement in the target loop for statement shifting.

In one embodiment, the relationship of the dependence distances of statements in a loop before and after statement shifting may be described by the following basic equation:

$$\text{distance\_}a[D] = \text{offset}[S_F] - \text{offset}[S_T] + \text{distance\_}b[D] \quad (1)$$

where: distance_a[D] and distance_b[D] are non-negative integers

In the above equation, D is a data dependence edge between statements in the DDG. Distance_b and distance_a are arrays that represent distance vectors of all the dependence distances before and after statement shifting, respectively. $S_F$ and $S_T$ are the start and the end of the dependence edge D, respectively. The array offset represents shifting vectors of all statements during shifting. These shifting vectors determine the shifting mappings of statements in the loop.

A basic equations group may then be created by applying basic equation (1) to each dependence between statements in a loop. In basic equation (1) above, distance_a array determines the DDG after statement shifting. In addition, offset array determines the loop after statement shifting is completed. However, both distance_a and offset are unknown from the original loop. In some embodiments, a dependence equations group may be constructed to solve distance_a array. Once distance_a array is known, offset may then also be solved.

In the dependence equations group, each equation is expressed as:

$$\Sigma_{i=1\ldots m} \text{distance\_}a[D_i] * a_i = \Sigma_{i=1\ldots m} \text{distance\_}b[D_i] * a_i \quad (2)$$

where: m=number of dependence edges in DDG
$a_i$=integer coefficient

As distance_b array is known before statement shifting from the DDG, equation (2) may be rewritten as:

$$\Sigma_{i=1\ldots m} \text{distance\_}a[D_i] * a_i = B \quad (3)$$

where: B=vector of integer vector

In one embodiment, to create the dependence equations group from DDG, the following algorithm, identified as algorithm A, may be implemented.

Algorithm A:

(1) Build DDG for the loop dependences in the loop.

(2) For each MUCS in the DDG, generate a ST. Each dependence in the ST is known as a basic dependence.

(3) Any dependence that is in the MUCS, but not in the ST, is known as a common dependence. Each common dependence is inside a unique undirected circle whose all other edges are in ST. This circle is called a basic undirected circle. Every basic undirected circle determines an equation in the dependence equations group. An arbitrary direction may be chosen to be a positive direction of the basic undirected circle. Then, for every dependence arc D, if D is not in the basic undirected circle, the coefficient (i.e., $a_i$) of distance_a[D] and distance_b[D] in equations (2) and (3) described above is 0. Otherwise, if the direction of D is positive, the coefficient is 1 and if the direction of D is negative, the coefficient is −1.

FIGS. 2A through 2E depict an example of statement shifting by basic equations group and dependence equations group, such as by utilizing the techniques described above. FIG. 2A is an exemplary original loop of program code. FIG. 2B is the DDG of the loop before statement shifting. As seen, each edge corresponds to a dependency between statements in the loop and is identified with a weight before statement shifting.

FIG. 2C is a basic equations group that is determined from the DDG in FIG. 2B. Every dependence between statements in the loop determines a basic equation of the basic equations group. Referring to the DDG of FIG. 2B, there are eight edges representing eight dependencies between statements in the original loop. As a result, there are eight basic equations in the basic equations group as illustrated in FIG. 2C. In one embodiment, each basic equation is created from equation (1) described above.

FIG. 2D is a ST of the DDG of FIG. 2B. FIG. 2E is the dependence equations group determined from this ST. The dependence equations of the dependence equations group are determined according to equation (3) and algorithm A described above. There are five basic undirected circles in the DDG as determined with the ST. As a result, there are five dependence equations derived from these basic undirected circles.

Once the dependence equations group is determined, it is possible to solve for distance_a, and thereby solve for offset. FIG. 3 is a pseudo-code listing depicting a one embodiment of an algorithm to solve offset. In one embodiment, given that distance_a array satisfies the dependence equations group, offset array may then be solved according to the algorithm described with respect to FIG. 3. Once offset is determined, the shifting vector for statement shifting of a loop may be determined.

FIGS. 4A through 4D show one embodiment of an example of the application of statement shifting to a loop. Initially, FIG. 4A is an original loop before statement shifting is applied. Then, FIG. 4B illustrates the DDG of this loop before statement shifting. At this point, the basic equations group and dependence equations group are created for the loop. In one embodiment, equations (1), (3), and algorithm A, each described above, may be applied to the loop to determine the offset or shifting vector for each statements in the loop.

FIGS. 4C and 4D present the DDG and loop, respectively, after statement shifting. For example, as seen in FIG. 4D, the offset of S2 after statement shifting is <1,1>. Similarly, the shifting mapping of S2 is J'=J+1 and K'=K+1 (where <J, K> is the loop index of original loop and <J',K'> is the loop index of the loop after statement shifting).

In embodiments of the invention, statement shifting may be utilized to explore more parallel chances for loop transformations. These loop transformations may include techniques such as unimodular transformation and greatest common divisor (GCD) transformation. One skilled in the art will appreciate that these transformations are not the only transformations that statement shifting may apply to. For example, statement shifting may also apply to other loop transformations, such as fusion, fission, blocking, shifting, and affine partitioning.

The following description serves to illustrate in an exemplary fashion the benefits and application of statement shifting to specific loop transformation techniques. Furthermore, the following description assumes that one skilled in the art is knowledgeable in the prior art loop transformation techniques.

In some embodiments, statement shifting may be utilized to improve the loop transformation technique of unimodular transformation. Unimodular transformation combines loop interchanges, reversal, and skewing, which are three basic transformations that reorder iterations of nested loops by unimodular matrix transformation. A unimodular matrix is a square, integer matrix where the absolute value of the determinant is 1.

FIG. 5 is one embodiment of a code listing illustrating how statement shifting improves parallelism of unimodular transformation. The loop shown in FIG. 5 is the application of statement shifting and unimodular transformation to the original loop of FIG. 4A. The distance matrix of the original loop in FIG. 4A is $$\begin{pmatrix} 1 & 2 \\ 1 & 1 \end{pmatrix}.$$

The rank of this matrix for parallelization purposes is 2.

After statement shifting, such as that depicted in FIG. 4D, the distance matrix of the loop is $$\begin{pmatrix} 0 & 0 \\ 2 & 3 \end{pmatrix}.$$

The rank of this matrix is 1, which increases the parallelization chances for unimodular transformation. FIG. 5 depicts the resulting loop after the unimodular transformation to the loop of FIG. 4A.

In other embodiments, statement shifting may be utilized to improve the loop transformation technique of GCD transformation. GCD transformation is a kind of remainder transformation. It realizes loop partition by a greatest common divisor of the distance vector of each nested loop.

FIG. 6 presents one embodiment of an algorithm to solve distance_a in order to increase the parallel chances for GCD transformation. The algorithm presented in FIG. 6 may be utilized to find optimal statement shifting that enables maximal parallelization chances for GCD transformation. For example, in one embodiment, the following algorithm, identified as algorithm B, finds optimal statement shifting for GCD transformation.

Algorithm B:

(1) Build a DDG representing statements in a loop.

(2) From the DDG, specify the dependence equations group according to equation (3) above, specifically as A×distance_a=B, where A is the coefficient matrix and B is a known vector. When the loop is single dimensional, every element of B is an integer. When the loop is nested, every element of B is an integer vector so that B is viewed as a known integer matrix.

(3) The values of distance_a array may be viewed as a matrix, and may be solved step-by-step. In each step, one row of distance_a matrix is solved. The parameter m is specified as the GCD of all elements in k-th column of B in the dependence equations group. Then, the algorithm depicted in FIG. 6 may be used to solve the k-th row of distance_a matrix. In this algorithm, the old weight function W(x–>y) is used to get the k-th element from the distance vector of the dependence x–>y. The new weight function W' in step 2 above records the solution of the k-th row of distance_a. The parameter m is the maximal common factor of all integers in the k-th row of B.

In embodiments of the invention, the algorithm in FIG. 6 operates to set all weights to be a times factor of m, so that m continuous iterations of the corresponding loop level can be fully parallelized.

FIGS. 7A through 7D present one embodiment of an example application of the above algorithm B to the original loop of FIG. 2A. FIG. 7A is the DDG after step 1 (when solving for the $1^{st}$ row of distance_a matrix) where the altitude of each statement is marked beside the statement. FIG. 7B is after step 2 (when solving for the $1^{st}$ row of distance_a matrix) where the $1^{st}$ row of distance_a matrix is solved.

FIGS. 7C and 7D depict the results after steps 1 and 2 (when solving for the $2^{nd}$ row of distance_a matrix) where solving for altitude and then solving the $2^{nd}$ row, respectively.

After the above algorithm is applied, the distance_a matrix of the loop of FIG. 2A is $$\begin{pmatrix} 2 & 2 & 2 & 0 & 0 & 2 & 0 & 0 \\ 2 & 4 & 4 & 0 & 4 & 0 & 0 & 2 \end{pmatrix}^T.$$

As illustrated from this matrix, the GCD of the first and second rows is 2. As a result, the parallel chances for the GCD transformation are increased.

Embodiments of the invention present a type of loop shifting known as statement shifting. Statement shifting is implemented by solving basic and dependence equations groups. The dependence equations group provides accurate constraints of statement shifting. Statement shifting exposes the essence of constraints in a loop transformation so that there are no extra constraints remaining in the dependence equations group, which results in optimal loop transformations. Different loop transformation solutions may be obtained according to any particular policies that are being employed. Different solutions may benefit different loop transformations.

Figure 8:
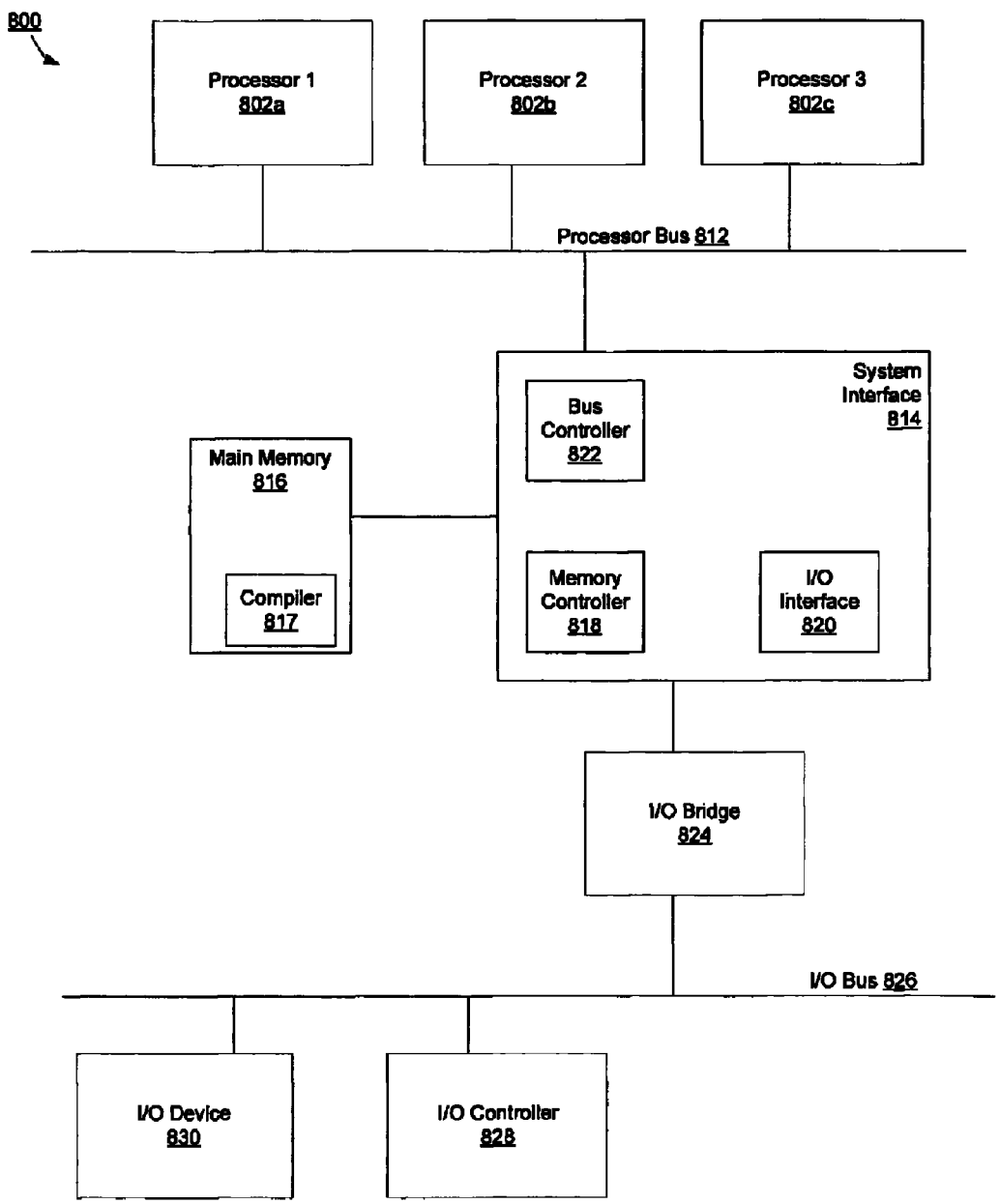
FIG. 8 illustrates a block diagram of an exemplary computer system used in implementing one or more embodiments of the invention.

FIG. 8 is a block diagram illustrating an exemplary computer system 800 used in implementing one or more embodiments of the invention. The computer system (system) 800 includes one or more processors 802a-c. The processors 802a-c may include one or more single-threaded or multi-threaded processors. A typical multi-threaded processor may include multiple threads or logical processors, and may be capable of processing multiple instruction sequences concurrently using its multiple threads.

Processors 802a-c may also include one or more internal levels of cache and a bus controller or bus interface unit to direct interaction with the processor bus 812. As in the case of chip multiprocessors or multi-core processors, processors 802a-c may be on the same chip. The chip may include shared caches, interprocessor connection network and special hardware support such as those for SPT execution (not shown). Furthermore, processors 802a-c may include multiple processor cores. Processor bus 812, also known as the host bus or the front side bus, may be used to couple the processors 802a-c with the system interface 814.

System interface 814 (or chipset) may be connected to the processor bus 812 to interface other components of the system 800 with the processor bus 812. For example, system interface 814 may include a memory controller 818 for interfacing a main memory 816 with the processor bus 812. The main memory 816 typically includes one or more memory cards and a control circuit (not shown). System interface 814 may also include an input/output (I/O) interface 820 to interface one or more I/O bridges or I/O devices with the processor bus 812. For example, as illustrated, the I/O interface 820 may interface an I/O bridge 824 with the processor bus 812. I/O bridge 824 may operate as a bus bridge to interface between the system interface 814 and an I/O bus 826. One or more I/O controllers and/or I/O devices may be connected with the I/O bus 826, such as I/O controller 828 and I/O device 830, as illustrated. I/O bus 826 may include a peripheral component interconnect (PCI) bus or other type of I/O bus.

System 800 may include a dynamic storage device, referred to as main memory 816, or a random access memory (RAM) or other devices coupled to the processor bus 812 for storing information and instructions to be executed by the processors 802*a-c*. Main memory 816 may also be used for storing temporary variables or other intermediate information during execution of instructions by the processors 802*a-c*. System 800 may include a read only memory (ROM) and/or other static storage device coupled to the processor bus 812 for storing static information and instructions for the processors 802*a-c*. Main memory 816 or dynamic storage device may include a magnetic disk or an optical disc for storing information and instructions. In some embodiments, main memory 816 may include instructions to execute a compiler 817. Compiler 817 may operate to assist in the implementation of various embodiments of the present invention.

I/O device 830 may include a display device and/or an input device. System 800 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 800 may be coupled with a number of clients and/or servers via a conventional network infrastructure, such as a company's intranet and/or the Internet, for example.

It is appreciated that a lesser or more equipped system than the example described above may be desirable for certain implementations. Therefore, the configuration of system 800 may vary from implementation to implementation depending upon numerous factors, such as price constraints, performance requirements, technological improvements, and/or other circumstances.

It should be noted that, while the embodiments described herein may be performed under the control of a programmed processor, such as processors 802*a-c*, in alternative embodiments, the embodiments may be fully or partially implemented by any programmable or hardcoded logic, such as field programmable gate arrays (FPGAs), transistor transistor logic (TTL) logic, or application specific integrated circuits (ASICs). Additionally, the embodiments of the invention may be performed by any combination of programmed general-purpose computer components and/or custom hardware components. Therefore, nothing disclosed herein should be construed as limiting the various embodiments of the invention to a particular embodiment wherein the recited embodiments may be performed by a specific combination of hardware components.

In the above description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the invention. It will be appreciated, however, to one skilled in the art that the embodiments of the invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

The various embodiments of the invention set forth above may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the invention may be provided as a computer program product, which may include a machine-readable medium having stored thereon instructions, which may be used to program a computer (or other electronic devices) to perform a process according to various embodiments of the invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the invention may also be downloaded as a computer program product, wherein the program may be transferred from a remote computer to a requesting computer via a communication link (e.g., a modem or network connection).

Similarly, it should be appreciated that in the foregoing description, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Whereas many alterations and modifications of the invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method for statement shifting to increase parallelism of loops for compiler optimization, comprising:
    constructing a data dependence graph (DDG) to represent dependences between statements in a loop;
    constructing a basic equations group from the DDG;
    constructing a dependence equations group derived in part from the basic equations group by:
        generating a spanning tree for each maximal undirected connected sub-graph (MUCS) in the DDG;
        identifying one or more basic undirected circles for each dependence of the DDG that is in the MUCS and not in the spanning tree, wherein all other dependences in each basic undirected circle are in the spanning tree; and
        creating a dependence equation for the dependence equations group from each of the one or more basic undirected circles; and
    determining a shifting vector for the loop from the dependence equations group, wherein the shifting vector to represent an offset to apply to each statement in the loop for statement shifting.

2. The method of claim 1, further comprising applying the shifting vector to the loop to create a statement shifted loop with parallelization constraints removed.

3. The method of claim 1, wherein a MUCS is a sub-graph of the DDG having the properties of being undirected and connected, and to which no node in the DDG is added without violating the undirected and connected properties.

4. The method of claim 1, wherein a basic equation of the basic equations group is expressed as distance_a[D]=offset[$S_F$]−offset[$S_T$]+distance_b[D], wherein D is a dependence edge between the statements in the loop, distance_a is an array of distance vectors of the dependences after the statement shifting, distance_b is an array of distance vectors of the dependences before the statement shifting, $S_F$ and $S_T$ are start and end nodes of the dependence edge D, and offset is an array representing the shifting vector during the statement shifting.

5. The method of claim 4, wherein a dependence equation of the dependence equations group is expressed as $\Sigma_{i=1 \ldots m}$distance_a[$D_i$]*$a_i$=B, wherein $a_i$ is an integer coefficient, m is a number of the statements in the loop, and B is a vector of integer vectors.

6. The method of claim 2, wherein a loop transformation technique is applied to the statement shifted loop to increase parallelization chances for the loop.

7. The method of claim 6, wherein the loop transformation technique includes at least one of a unimodular transformation and a greatest common divisor (GCD) transformation.

8. A machine-accessible medium for statement shifting to increase parallelism of loops for compiler optimization, the machine-accessible medium having stored thereon data representing sets of instructions that, when executed by a machine, cause the machine to perform operations comprising:
constructing a data dependence graph (DDG) to represent dependences between statements in a loop;
constructing a basic equations group from the DDG;
constructing a dependence equations group derived in part from the basic equations group by:
generating a spanning tree for each maximal undirected connected sub-graph (MUCS) in the DDG;
identifying one or more basic undirected circles for each dependence of the DDG that is in the MUCS and not in the spanning tree, wherein all other dependences in each basic undirected circle are in the spanning tree; and
creating a dependence equation for the dependence equations group from each of the one or more basic undirected circles; and
determining a shifting vector for the loop from the dependence equations group, wherein the shifting vector to represent an offset to apply to each statement in the loop for statement shifting.

9. The machine-accessible medium of claim 8, further comprising applying the shifting vector to the loop to create a statement shifted loop with parallelization constraints removed.

10. The machine-accessible medium of claim 9, wherein a loop transformation technique is applied to the statement shifted loop to increase parallelization chances for the loop.

11. The machine-accessible medium of claim 10, wherein the loop transformation technique includes at least one of a unimodular transformation and a greatest common divisor (GCD) transformation.

12. The machine-accessible medium of claim 8, wherein a basic equation of the basic equations group is expressed as distance_a[D]=offset[$S_F$]−offset[$S_T$]+distance_b[D], wherein D is a dependence edge between the statements in the loop, distance_a is an array of distance vectors of the dependences after the statement shifting, distance_b is an array of distance vectors of the dependences before the statement shifting, $S_F$ and $S_T$ are start and end nodes of the dependence edge D, and offset is an array representing the shifting vector during the statement shifting.

13. The machine-accessible medium of claim 12 wherein a dependence equation of the dependence equations group is expressed as $\Sigma_{i=1 \ldots m}$distance_a[$D_i$]*$a_i$=B, wherein $a_i$ is an integer coefficient, m is a number of the statements in the loop, and B is a vector of integer vectors.

14. A system for statement shifting to increase parallelism of loops for compiler optimization, comprising:
a processor coupled with memory;
the memory including instructions to implement a compiler, the compiler to:
construct a data dependence graph (DDG) to represent dependences between statements in a loop;
construct a basic equations group from the DDG;
construct a dependence equations group derived in part from the basic equations group by the compiler further to:
generate a spanning tree for each maximal undirected connected sub-graph (MUCS) in the DDG;
identify one or more basic undirected circles for each dependence of the DDG that is in the MUCS and not in the spanning tree, wherein all other dependences in each basic undirected circle are in the spanning tree; and
create a dependence equation for the dependence equations group from each of the one or more basic undirected circles; and
determine a shifting vector for the loop from the dependence equations group, the shifting vector to shift the statements in the loop in order to remove parallelization constraints of the loop.

15. The system of claim 14, wherein the shifting vector to represent an offset to apply to each statement in the loop for statement shifting.

16. The system of claim 15, wherein a loop transformation technique may be applied to the loop after statement shifting to increase parallelization chances for the loop.

17. The system of claim 16, wherein the loop transformation technique includes at least one of a unimodular transformation and a greatest common divisor (GCD) transformation.

* * * * *